(12) United States Patent
Catalano

(10) Patent No.: US 10,500,896 B2
(45) Date of Patent: Dec. 10, 2019

(54) FLEXIBLE WHEEL ASSEMBLY

(71) Applicant: Paul Catalano, Pleasanton, CA (US)

(72) Inventor: Paul Catalano, Pleasanton, CA (US)

( * ) Notice: Subject to any disclaimer, the term of this patent is extended or adjusted under 35 U.S.C. 154(b) by 425 days.

(21) Appl. No.: 15/393,146

(22) Filed: Dec. 28, 2016

(65) Prior Publication Data
US 2017/0239980 A1    Aug. 24, 2017

Related U.S. Application Data

(60) Provisional application No. 62/271,681, filed on Dec. 28, 2015.

(51) Int. Cl.
| | | |
|---|---|---|
| *B60B 9/00* | (2006.01) | |
| *B60B 3/02* | (2006.01) | |
| *B60B 27/06* | (2006.01) | |
| *B60C 7/26* | (2006.01) | |

(52) U.S. Cl.
CPC ............... *B60B 9/00* (2013.01); *B60B 3/02* (2013.01); *B60B 27/065* (2013.01); *B60C 7/26* (2013.01); *B60B 2360/32* (2013.01); *B60B 2360/50* (2013.01); *B60B 2900/325* (2013.01); *B60B 2900/523* (2013.01)

(58) Field of Classification Search
CPC ........... B60B 9/00; B60B 27/065; B60B 3/02; B60B 2900/325; B60B 2900/523; B60B 2360/32; B60B 2360/50; B60C 7/26
USPC .......................................................... 152/7
See application file for complete search history.

(56) References Cited

U.S. PATENT DOCUMENTS

| | | | | | |
|---|---|---|---|---|---|
| 2,687,682 | A | * | 8/1954 | Oehler | A01C 5/068 152/454 |
| 2,878,074 | A | * | 3/1959 | Cawl | A47L 9/009 152/11 |
| 2,944,844 | A | * | 7/1960 | Miller | F16D 3/50 464/28 |
| 3,987,832 | A | * | 10/1976 | Funke | B60B 5/02 152/310 |
| 4,350,196 | A | * | 9/1982 | Hampshire | B29D 30/02 152/5 |
| 4,558,727 | A | * | 12/1985 | Golata | B60B 5/02 152/323 |
| 4,664,168 | A | * | 5/1987 | Hong | B29D 30/0685 152/504 |
| 4,705,087 | A | * | 11/1987 | Markow | B60B 9/00 152/12 |
| 4,739,810 | A | * | 4/1988 | Markow | B60B 9/00 152/12 |
| 9,656,515 | B2 | * | 5/2017 | Novoplanski | B60B 9/00 |
| 2014/0252790 | A1 | * | 9/2014 | Stuck | B60B 11/10 295/31.1 |

* cited by examiner

*Primary Examiner* — S. Joseph Morano
*Assistant Examiner* — Jean W Charleston
(74) *Attorney, Agent, or Firm* — West & Associates, A PC; Stuart J. West

(57) ABSTRACT

A wheel assembly comprising a wheel disk and a tread member disposed around the wheel disk. The wheel disk can have a substantially conical shape when in an unloaded state, but be flexible such that it can deform under load to optimize and/or maximize contact area between the tread member and a driving surface.

17 Claims, 4 Drawing Sheets

FLEXIBLE WHEEL ASSEMBLY

CLAIM OF PRIORITY

This Application claims priority under 35 U.S.C. § 119(e) from earlier filed U.S. Provisional Application Ser. No. 62/271,681, filed Dec. 28, 2015, which is hereby incorporated by reference.

BACKGROUND

Field of the Invention

The present disclosure relates to the field of vehicle tires, particularly a flexible wheel assembly having a replaceable outer tread.

Background

Motor vehicles have tires around their wheels to protect the wheel and provide cushioning, as well as providing traction when driving. Most conventional tires rely on components inflated with air, as air inside a tire can provide shock absorption and allow the tire's shape to change as it rotates to better conform with driving surfaces. However, inflatable tire components can be punctured, leading to flat tires. Additionally, when a tire is not properly inflated it can cause too much or too little of the tire to contact the driving surface, which can cause decreased vehicle performance while driving.

Many conventional tires also have a large number of components, such as treads, sidewalls, plies, liners, belts, and beads. Any of these components can wear down or fail over time, such that the entire tire would need to be replaced.

What is needed is a wheel assembly without air-inflated components, thereby eliminating concerns about flat tires or tires inflated to an incorrect pressure. The wheel assembly should be flexible such that it can deform to optimize and/or maximize contact area between the wheel assembly's tread and a driving surface.

DETAILED DESCRIPTION

Figure 1:
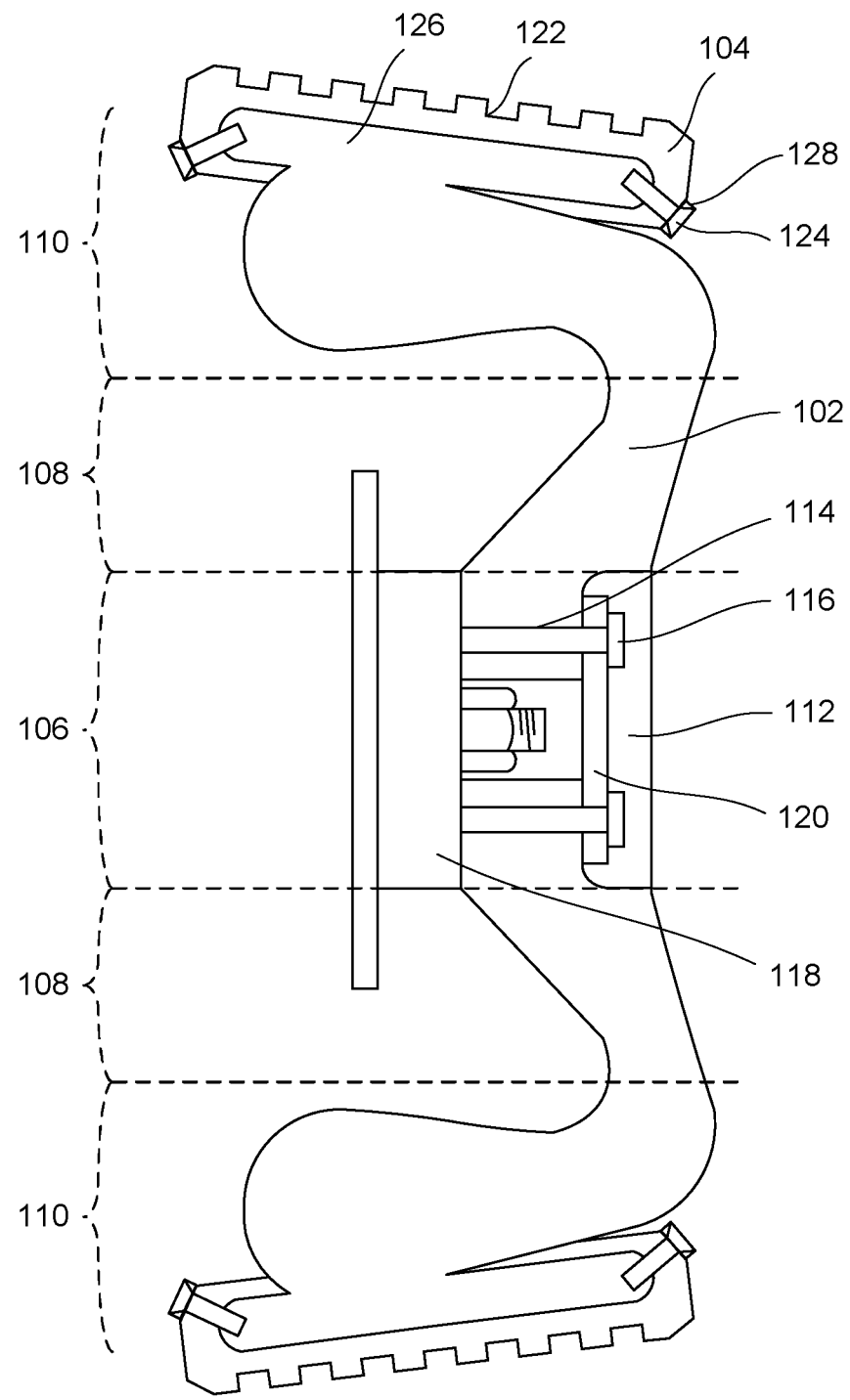
FIG. 1 depicts a cross sectional side view of an exemplary embodiment of a wheel assembly in an unloaded state.
Figure 2:
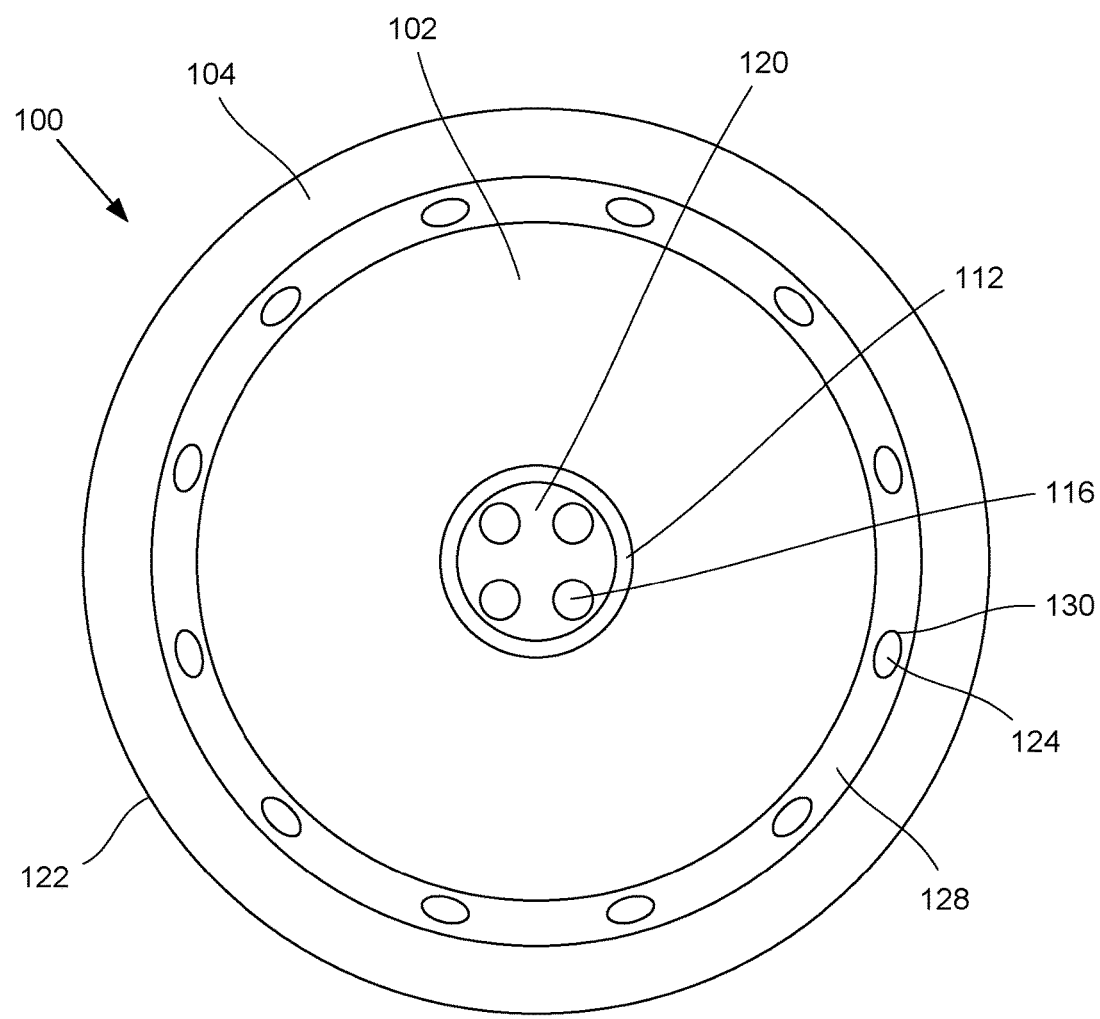
FIG. 2 depicts a front view of an exemplary embodiment of a wheel assembly.

FIG. 1 depicts a cross sectional side view of an exemplary embodiment of a wheel assembly 100, and FIG. 2 depicts a front view of an exemplary embodiment of a wheel assembly 100. A wheel assembly 100 can comprise a wheel disk 102 and a tread member 104.

The wheel disk 102 can be shaped with a circular profile as shown in FIG. 2, such that the wheel disk 102 can rotate about an axis at its center. The wheel disk 102 can have a central portion 106 centered at the wheel disk's axis at the center of its circular profile, an intermediate portion 108 extending outwardly from the central portion 106, and a rim portion 110 extending outwardly from the intermediate portion 108 at the exterior of the wheel disk's circular profile. As shown in FIG. 1, the wheel disk 102 can have a non-planar cross-sectional shape, such that its central portion 106, intermediate portion 108, and rim portion 110 have varying thicknesses and/or are oriented at different angles relative to one another.

The wheel disk's central portion 106 can define a hub 112. The hub 112 can be centered about the wheel disk's axis. The hub 112 can have one or more fastener holes 114 extending through the central portion 106. Fasteners 116 can pass through the fastener holes 114 to couple the wheel disk 102 to a motor vehicle's hub and axle assembly 118. Fasteners 116 can be bolts, screws, or any other type of fastener. The fasteners 116 can pull the face of the wheel disk 102 against toward a vehicle's hub and axle assembly 118.

In some embodiments the wheel assembly 100 can comprise a fastener plate 120 that can be positioned at the central portion 106. The fastener plate can be a planar element made of metal, plastic, or any other substantially rigid material. The fastener plate 120 can define fastener holes 114 in locations that can be aligned with fastener holes 114 in the wheel disk 102. As such, fasteners 116 can pass through aligned fastener holes 114 in the fastener plate 120 and the wheel disk 102 to secure the wheel disk 102 and fastener plate 120 to a vehicle's hub and axle assembly 118. By way of a non-limiting example, the fasteners 116 can be threaded bolts that extend through the fastener holes 114 in the fastener plate 120 and wheel disk 102 into threaded holes in an automobile's hub and axle assembly 118. Tightening the fasteners 116 into the hub and axle assembly 118 can cause the fastener plate 120 to grip the wheel disk 102 and secure it to a hub and axle assembly 118.

In some embodiments the hub 112 can be partially recessed from a front face of the wheel disk 102, such that the fastener plate 120 and/or ends of fasteners 116 are recessed from the front face of the wheel disk 102 as shown in FIG. 1. In other embodiments the fastener plate 120 and/or ends of fasteners 116 can be flush with the front face of the wheel disk 102 or extend past its front face.

The wheel disk's intermediate portion 108 can extend radially outward from the central portion 106 toward the rim portion 110. In some embodiments, the intermediate portion's thickness can decrease as it extends away from the central portion 106. The intermediate portion 108 can also extend radially outwardly in a non-planar direction, such that the intermediate portion 108 is substantially conical when considered in three dimensions. The intermediate portion's conical shape can be centered in an axial direction along the central axis of the wheel disk 102. By way of a non-limiting example, intermediate portions 108 of the wheel disk 102 shown in the cross sectional view of FIG. 1 are angled away from a straight vertical line, and the thickness of the intermediate portions 108 taper from the wider central portion 106 to being narrower farther away from the central portion 106.

The wheel's rim portion 110 can extend from the intermediate portion 108. The rim portion 110 can be bent relative to the intermediate portion 108 in a direction tending toward the location at which the central portion 106 would couple with a vehicle's hub and axle assembly 118. As such, as the wheel disk 102 extends radially outward from the central portion 106, the wheel disk's cross-sectional shape can have a curve at the junction between the intermediate portion 108 and the rim portion 110 such that the rim portion 110 is bent toward the wheel disk's the axial direction as shown in FIG. 1. In some embodiments the thickness of the wheel disk 102 can be at a minimum proximate to the junction between the intermediate portion 108 and the rim portion 110, and the thickness can increase in the rim portion 110 as it extends away from that junction.

The wheel disk's central portion 106 and intermediate portion 108 can form a front face of the wheel disk 102, while the rim portion 110 forms a circular side wall that extends from the edges of the wheel disk's front face. The tread member 104 can be coupled around the exterior surface of the rim portion's circular side wall. The rim portion 110 and tread member 104 can extend from the front face of the wheel disk 102 beyond the back face of the central portion and intermediate portions. As such, in some embodiments back portions of the rim portion 110 and tread member 104 can be disposed around a motor vehicle's hub and axle assembly 118.

The tread member 104 can comprise a loop of material forming a substantially cylindrical shape, such that the tread member 104 can be disposed around the rim portion 110 of the wheel disk 102. In some embodiments the tread member 104 can comprise natural and/or synthetic rubber. In other embodiments the tread member 104 can comprise plastic or any other desired material.

The tread member 104 can have a tread pattern 122 on portions configured to contact roads or other surfaces. The tread pattern 122 can define grooves, ridges, indentations, protrusions, or other elements in an arrangement configured to provide the wheel assembly 100 with traction on roads or other surfaces when the wheel assembly 100 is installed on a vehicle. By way of a non-limiting example, the tread pattern 122 can be similar to that of a conventional vehicle tire.

In some embodiments, the tread member 104 can be coupled with the wheel disk 102 using tread fasteners 124. Tread fasteners 124 can be screws, bolts, clips, or any other type of fastener. In some embodiments tread fasteners 124 can be positioned in a symmetrical pattern around the circumference of the wheel disk 102, such that each tread fastener 124 is equidistant from neighboring tread fasteners 124. In other embodiments the tread fasteners 124 can be positioned in any other pattern or arrangement. In some embodiments the tread member 104 can be alternately or additionally coupled with the wheel disk 102 using interlocking components, adhesives, fusing, or any other desired coupling mechanism.

In some embodiments the rim portion 110 of the wheel disk 102 can have a tread flange 126. The tread flange 126 can extend from the rim portion 110 such that notches are positioned between the tread flange 126 and other outwardly facing portions of the rim portion 110. In these embodiments the tread member 104 can be fit over the tread flange 126, and side edges of the tread member 104 can be inserted into the notches to assist in securing the tread member 104 around the wheel disk 102. Tread fasteners 124 can pass through the tread member 104 and into the tread flange 126 to secure the tread member 104 to the tread flange 126.

In some embodiments the wheel assembly 100 can further comprise one or more retainer strips 128. A retainer strip 128 can be a circular loop of material positioned proximate to edges of the tread member 104. A retainer strip 128 can be a circular loop of metal, plastic, or any other material. In some embodiments the wheel assembly 100 can have two retainer strips 128, one on its front face on one on its back face. In other embodiments the wheel assembly 100 can have one retainer strip 128 on its front face or back face.

Tread fasteners 124 can hold a retainer strip 128 against the tread member 104, such that the retainer strip 128 can hold edges of the tread member 104 against the wheel disk 102 between the tread fasteners 124. In some embodiments a retainer strip 128 can be positioned on the tread member 104 alone. In other embodiments a retainer strip 128 can partially extend over a face of the wheel disk 102, such that the retainer strip 128 covers the seam between the wheel disk 102 and tread member 104. By way of a non-limiting example, that can positioned to partially overlap the front face of the wheel disk 102 and a portion of the tread member 104, proximate to where the tread member 104 wraps underneath the tread flange 126. In some embodiments tread fasteners 124 can pass through holes 130 in the retainer strip 128. By way of a non-limiting example, tread fasteners 124 can pass through holes 130 in the retainer strip 128, through the tread member 104, and into the tread flange 126.

Figure 3A:
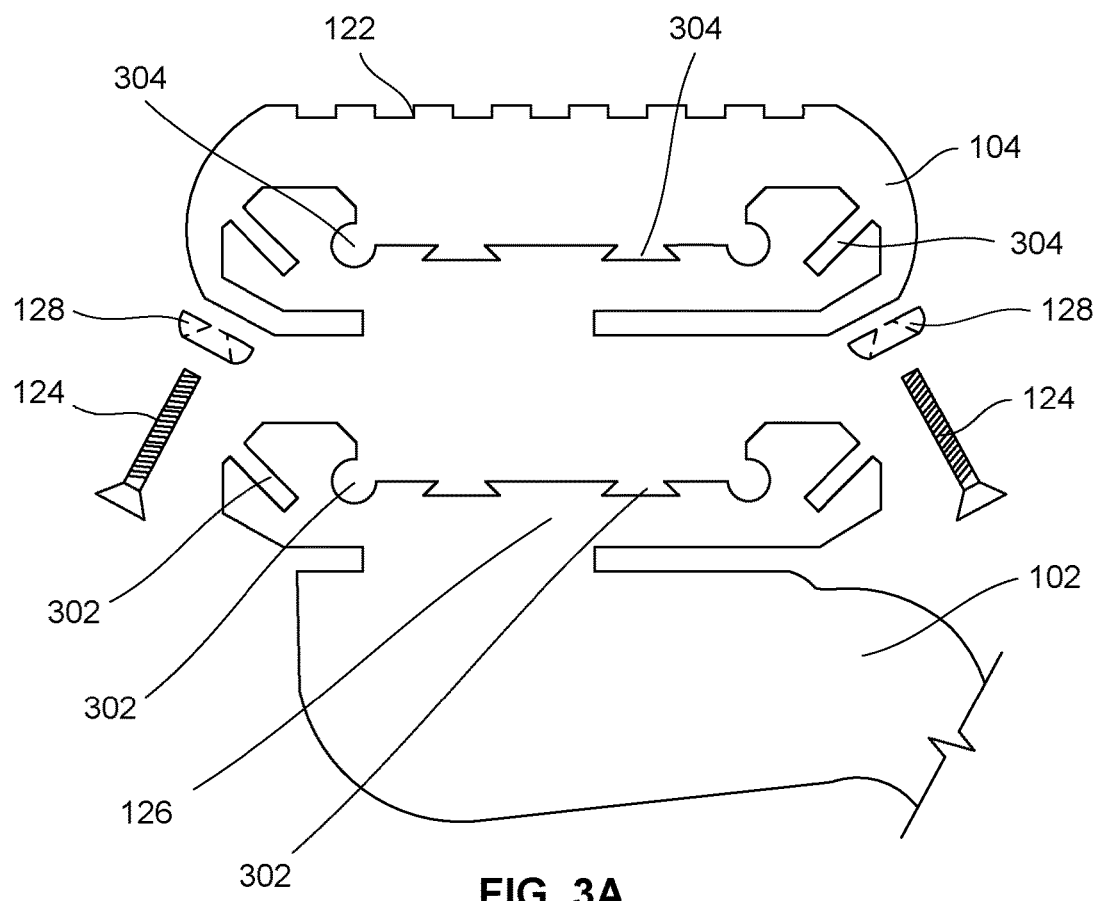
FIGS. 3A-3B depict exploded and assembled partial views of an embodiment of a tread flange and a tread member.
Figure 3B:
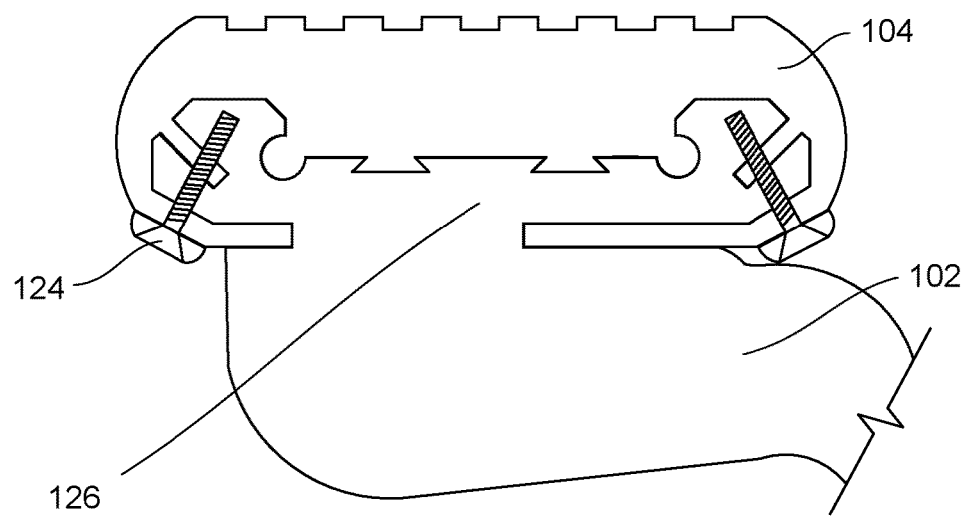

FIGS. 3A-3B depict exploded and assembled partial views of an alternate embodiment of a tread flange 126 and a tread member 104. In some embodiments surfaces of the tread flange 126 and tread member 104 that are in contact when the tread member 104 is installed around the wheel disk 102 can be shaped with corresponding notches 302 and protrusions 304. By way of a non-limiting example, as shown in FIGS. 3A-3B the tread member 104 can have a plurality of protrusions 304 that extend from its interior surface, such that the protrusions can be press fit into corresponding notches 302 on the outer surface of the tread flange 126. Tread fasteners 124 can secure the tread member 104 to the tread flange 126, and in some embodiments tread fasteners 124 pass through one or more interlocking notches 302 and protrusions 304 of the tread member 104 and tread flange 126. In other embodiments adjacent surfaces of the tread flange 126 and tread member 104 can be smooth as shown in FIG. 1, or have any other pattern or texture.

Figure 4:
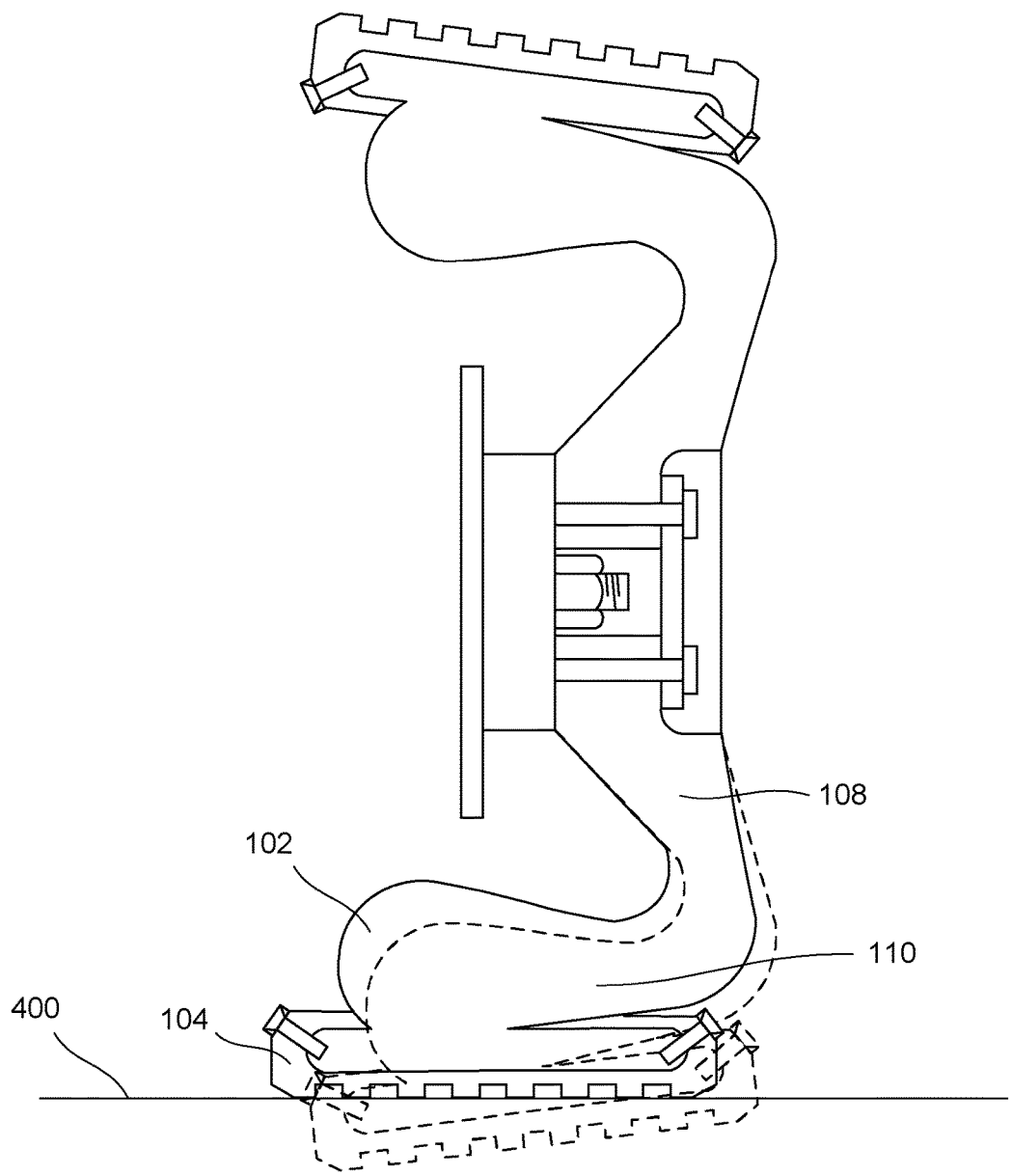
FIG. 4 depicts a cross sectional side view of an embodiment of a wheel assembly flexing to move between an unloaded state and a loaded state.

FIG. 4 depicts the wheel assembly 100 flexing during operation to conform its shape to a road surface 400. The wheel disk 102 can comprise flexible and resilient materials such that it flex under a load and return to its original shape when unloaded. The wheel disk's material can also be strong enough such that the wheel assembly 100 can support its share of a vehicle's weight during use. By way of a non-limiting example, in some embodiments the wheel disk 102 can be fabricated from a strong resilient plastic. In other embodiments the wheel disk 102 can alternately or additionally comprise plastics, polymers, fibers, and/or resins, such as thermoplastic polyamide nylons, polypropylene, nylon, fiberglass, biaxially-oriented polyethylene terephthalate, ethylene tetrafluoroethylene flouroplastic resin, and/or polyamide-imide resin. By way of a non-limiting examples, the wheel disk 102 can comprise Zytel, Mylar, Tefzel, and/or Torlon. In some embodiments the wheel disk 102 can comprise material that is lighter than the steel or other material used for conventional vehicle wheel components, such that the overall wheel assembly 100 is lighter than a conventional vehicle wheel.

In an unloaded state as shown in FIG. 1, the rim portion 110 and tread member 104 can be oriented with a pitch angled to be non-parallel to the wheel disk's axis of rotation, such that their front side edges proximate to the front face of the wheel disk 102 are closer together than their back side edges. However, the flexibility of the wheel disk 102 can allow it to flex such that the rim portion 110 and tread member 104 become substantially parallel to the wheel assembly's axial direction.

Accordingly, when the wheel assembly 100 is installed on a motor vehicle and contacts a road surface 400, its wheel disk 102 can deform as it rotates such that lower portions of the wheel assembly 100 compress and/or bend toward the vehicles' hub and axle assembly 118 as shown in FIG. 4. As such, the wheel assembly 100 can deform so that the contact area between the tread member 104 and the road surface 400 is maximized, and its tread pattern 122 lies flat on the road surface 400 across the contact area. As the wheel assembly 100 rotates, upper portions of the wheel assembly 100 can return to the unloaded shape wherein the rim portion 110 and tread member 104 are pitched so that their front side edges proximate to the front face of the wheel disk 102 are closer together than their back side edges. This spring action can optimize and/or maximize the tread member's footprint, the surface area of the portion of the tread member 104 that is in contact with the road surface 400. Additionally, when the wheel assembly 100 is used under a load, the tread member 104 can be pressed against the wheel disk 102 and be secured in place by the load weight, decreasing the possibility of loosening the tread member 104.

In some embodiments the wheel assembly's tread member 104 can be removable and/or replaceable, without replacing the wheel disk 102. By way of a non-limiting example, if the tread member 104 becomes worn or tears, the tread fasteners 124 can be removed such that the tread member 104 and/or retainer strip 128 can be removed from the wheel disk 102. A replacement tread member 104 can be disposed around the wheel disk 102, and the retainer strip 128 and tread fasteners 124 can be used to secure the replacement tread member 104 in place on the wheel disk 102. Similarly, tread members 104 having different tread patterns 122 can be switched out on the wheel assembly 100 depending on road or weather conditions.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A wheel assembly, comprising:
   a wheel disk, said wheel disk being rotatable about an axis and having a central portion centered about said axis, an intermediate portion extending radially outward from said central portion at an angle relative to said axis in a first direction, and a rim portion extending from said intermediate portion, said rim portion being bent relative to said intermediate portion toward said axis in a second direction; and
   a tread member coupled with wheel disk, said tread member being a loop disposed around said rim portion;
   wherein said rim portion and tread member are pitched at an angle relative to said axis when unloaded;
   wherein said wheel disk is flexible and resilient such that it deforms under load to orient said rim portion and tread member parallel to said axis across a contact area with a driving surface and returns to its unloaded shape at other portions of said wheel disk that are not in contact with the driving surface; and
   wherein said wheel disk has a tread flange extending from said rim portion, and edges of said tread member are inserted into notches between said tread flange and other portions of said wheel disk.

2. The wheel assembly of claim 1, wherein said tread member is coupled with said wheel disk by a plurality of tread fasteners that pass through said tread member into said wheel disk.

3. The wheel assembly of claim 2, further comprising a retainer strip positioned over said edges of said tread member, wherein said tread fasteners pass through said retainer strip and said tread member into said wheel disk, such that said retainer strip holds said edges of said tread member against said wheel disk.

4. The wheel assembly of claim 1, wherein said tread member is at least partially coupled with said wheel disk by interlocking protrusions and notches on said wheel disk and said tread member.

5. The wheel assembly of claim 1, wherein said central portion defines a hub having a plurality of fastener holes through which fasteners can pass to couple said wheel disk with a vehicle's hub and axle assembly.

6. The wheel assembly of claim 5, further comprising a fastener plate, wherein said fasteners hold said fastener plate against said wheel disk in said hub.

7. The wheel assembly of claim 5, wherein said hub is recessed relative to a front face of said wheel disk.

8. The wheel assembly of claim 1, wherein said tread member defines a tread pattern.

9. The wheel assembly of claim 1, wherein said wheel disk comprises a resilient plastic.

10. The wheel assembly of claim 1, wherein said tread member comprises rubber.

11. A wheel assembly, comprising:
    a wheel disk, said wheel disk being rotatable about an axis and having a tread flange extending around an outer rim of said wheel disk; and
    a tread member coupled with said wheel disk, said tread member being a loop disposed around said tread flange with edges positioned into notches between said tread flange and other portions of said wheel disk,
    wherein said tread flange and tread member are pitched at an angle relative to said axis when unloaded, and
    wherein said wheel disk is flexible and resilient such that it deforms under load to orient said tread flange and tread member parallel to said axis across a contact area with a driving surface and returns to its unloaded shape at other portions of said wheel disk that are not in contact with the driving surface.

12. The wheel assembly of claim 11, wherein said tread member is coupled with said wheel disk by a plurality of tread fasteners that pass through said tread member into said tread flange.

13. The wheel assembly of claim 12, further comprising a retainer strip positioned over an edge of said tread member, wherein said tread fasteners pass through said retainer strip and said tread member into said tread flange, such that said retainer strip holds said edge of said tread member against said tread flange.

14. The wheel assembly of claim 11, wherein said tread member is at least partially coupled with said tread flange by interlocking protrusions and notches on said tread flange and said tread member.

15. The wheel assembly of claim 11, wherein said wheel disk defines a hub centered about said axis, said hub having a plurality of fastener holes through which fasteners can pass to couple said wheel disk with a vehicle's hub and axle assembly.

16. The wheel assembly of claim 15, further comprising a fastener plate, wherein said fasteners hold said fastener plate against said wheel disk in said hub.

17. The wheel assembly of claim 15, wherein said hub is recessed relative to a front face of said wheel disk.

* * * * *